United States Patent [19]

Woolston

[11] 4,034,635

[45] July 12, 1977

[54] DIGITAL CUT-OFF CONTROL

[75] Inventor: Allan Brent Woolston, Wynnewood, Pa.

[73] Assignee: Molins Machine Company, Inc., Camden, N.J.

[21] Appl. No.: 678,562

[22] Filed: Apr. 20, 1976

[51] Int. Cl.² .................... B26D 1/56; B23D 25/12
[52] U.S. Cl. ..................................... 83/38; 83/311; 83/324; 83/343; 83/73
[58] Field of Search .............. 83/295, 298, 311, 38, 83/324, 287, 343, 73

[56] References Cited

U.S. PATENT DOCUMENTS

| 3,267,781 | 8/1966 | Sterns et al. | 83/311 X |
| 3,521,529 | 7/1970 | Strand | 83/311 X |
| 3,608,411 | 9/1971 | Schmidt | 83/311 X |

FOREIGN PATENT DOCUMENTS 624,398   7/1961   Canada ................................ 83/295

*Primary Examiner*—Willie G. Abercrombie
*Attorney, Agent, or Firm*—Seidel, Gonda & Goldhammer

[57] ABSTRACT

An improved cut-off control for operating a cut-off mechanism to cut sheets of uniform length from a moving web. The cut-off control comprises means for computing actual sheet length and sheet length error and for generating separate signals indicative thereof. Digital means cylically increment and decrement the actual sheet length signal. Digital means determine whether the sheet length error is within prescribed limits of the uniform sheet length in response to the cylically incremented and decremented actual sheet length signal. A positioning motor corrects the sheet length error if it is determined to be outside the prescribed limits. Digital means simulate the correction of sheet length error effected by the positioning motor and correct the actual sheet length signal as a function thereof.

10 Claims, 15 Drawing Figures

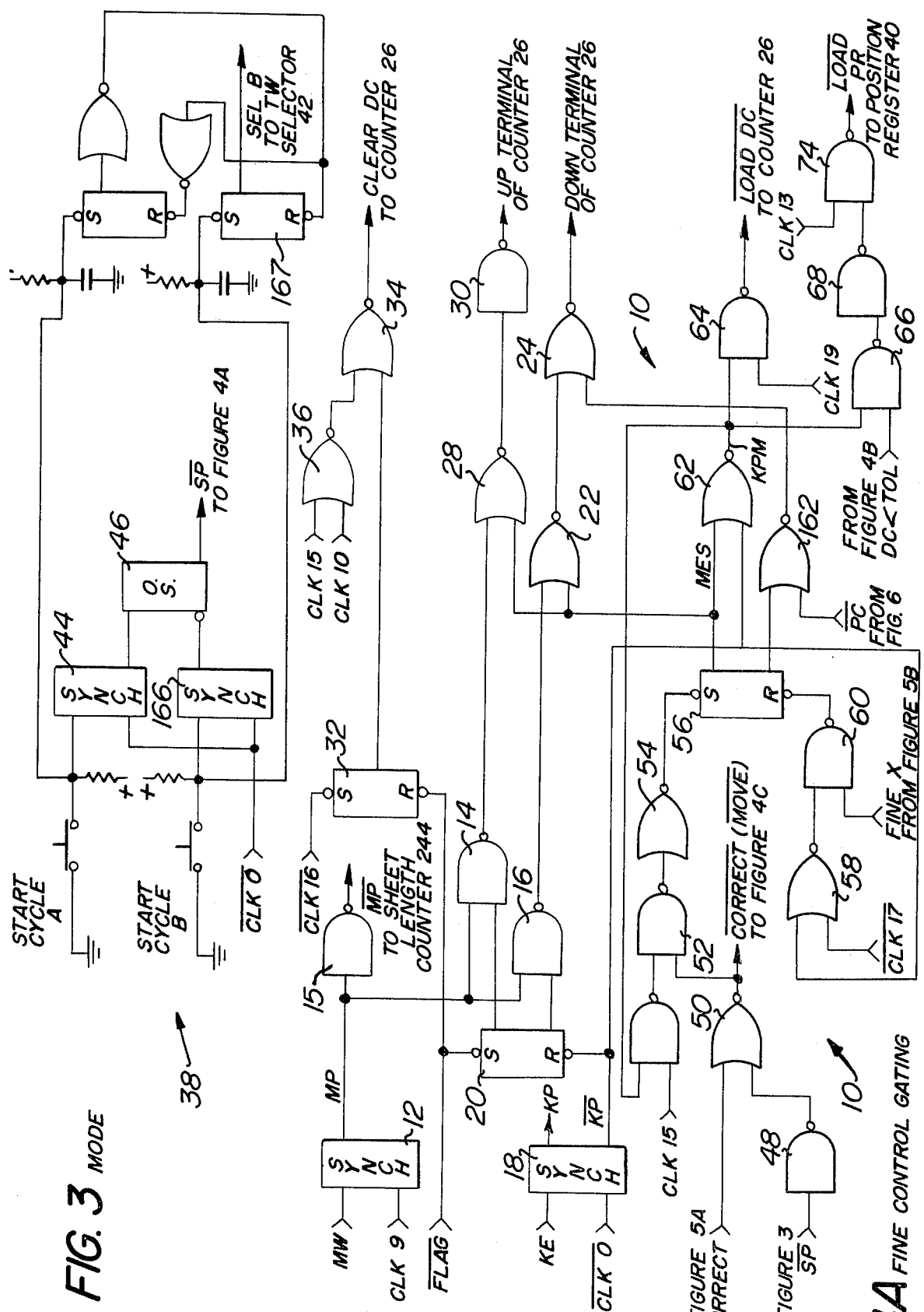

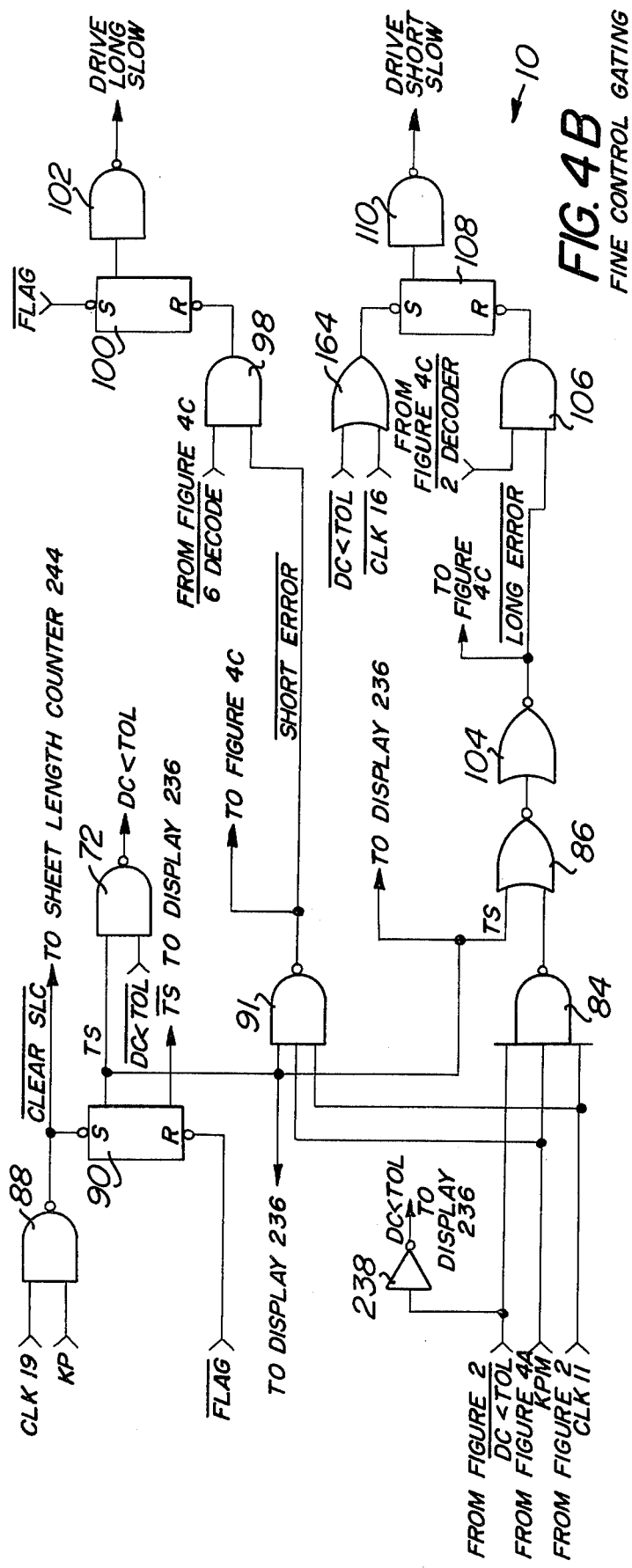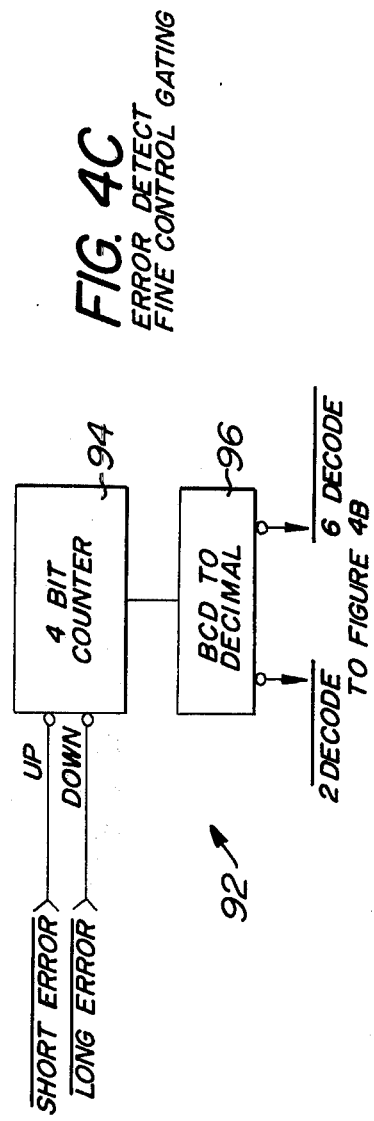
FIG. 4B FINE CONTROL GATING
FIG. 4C ERROR DETECT FINE CONTROL GATING

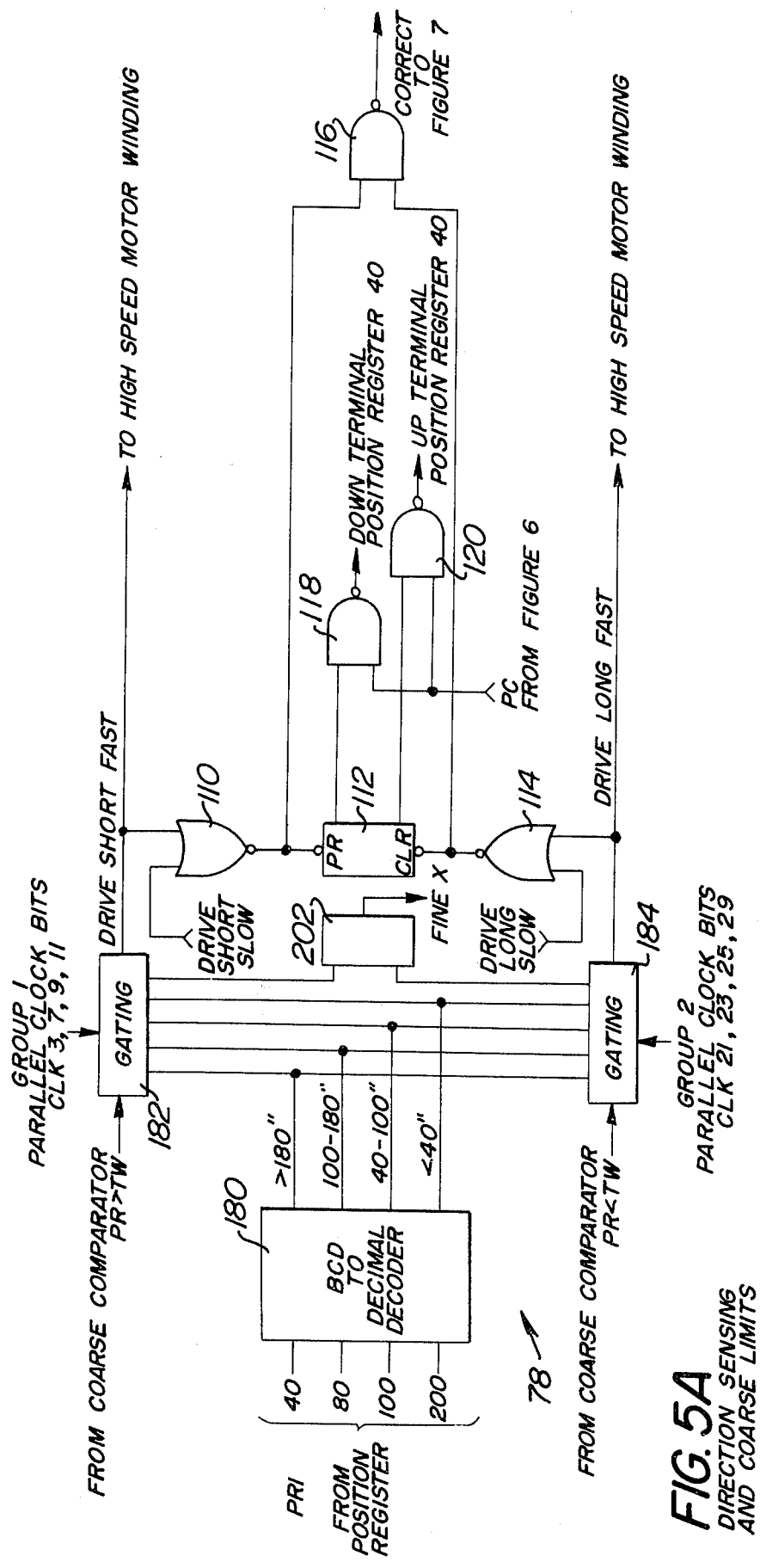
FIG. 5A DIRECTION SENSING AND COARSE LIMITS

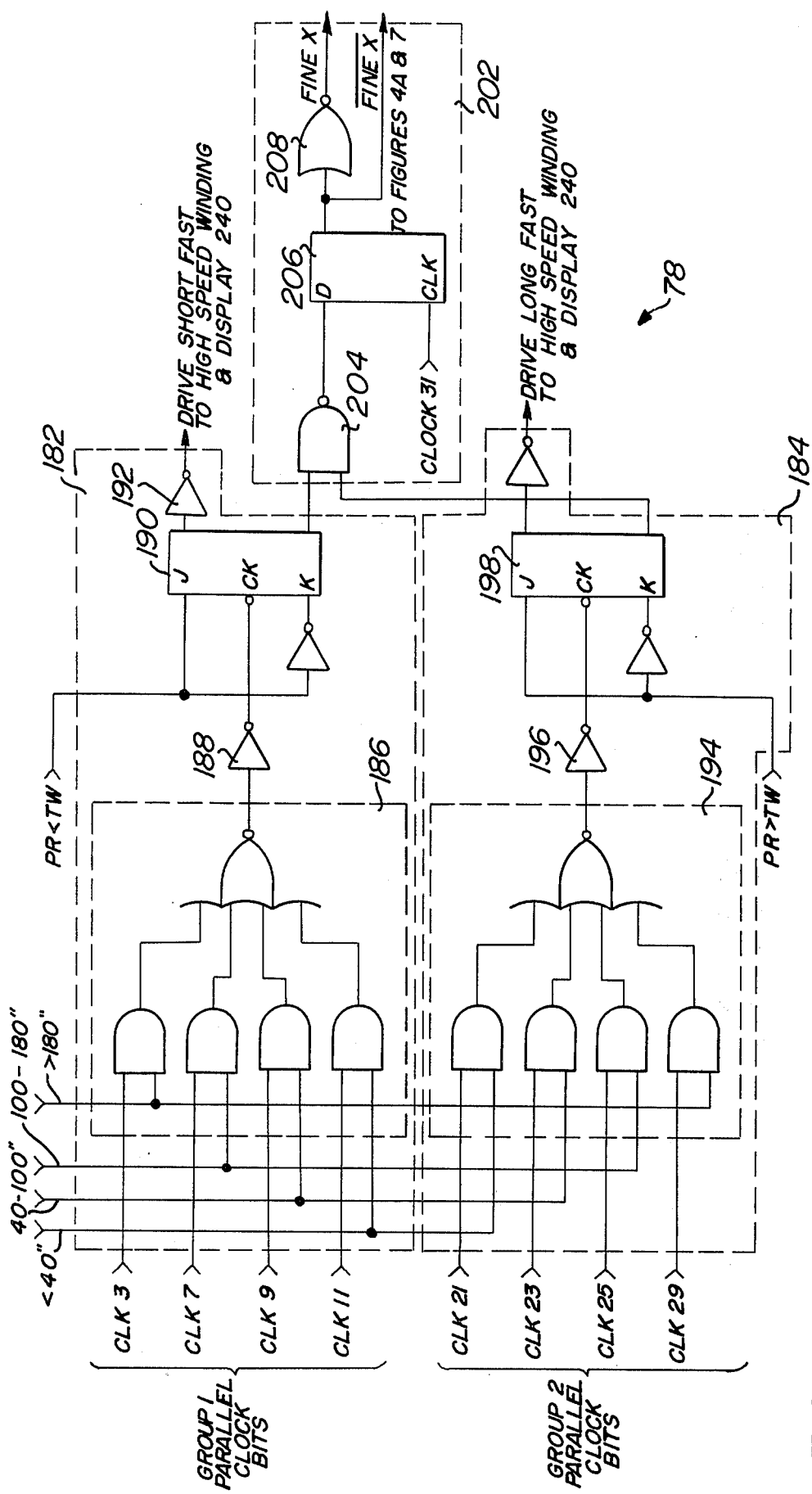
FIG. 5B DIRECTION SENSING AND COARSE LIMITS

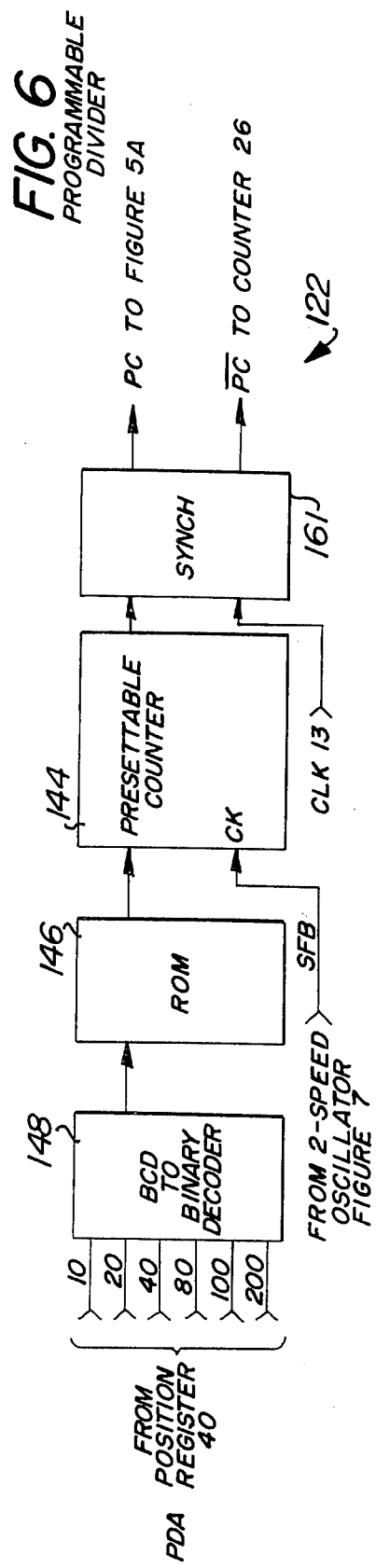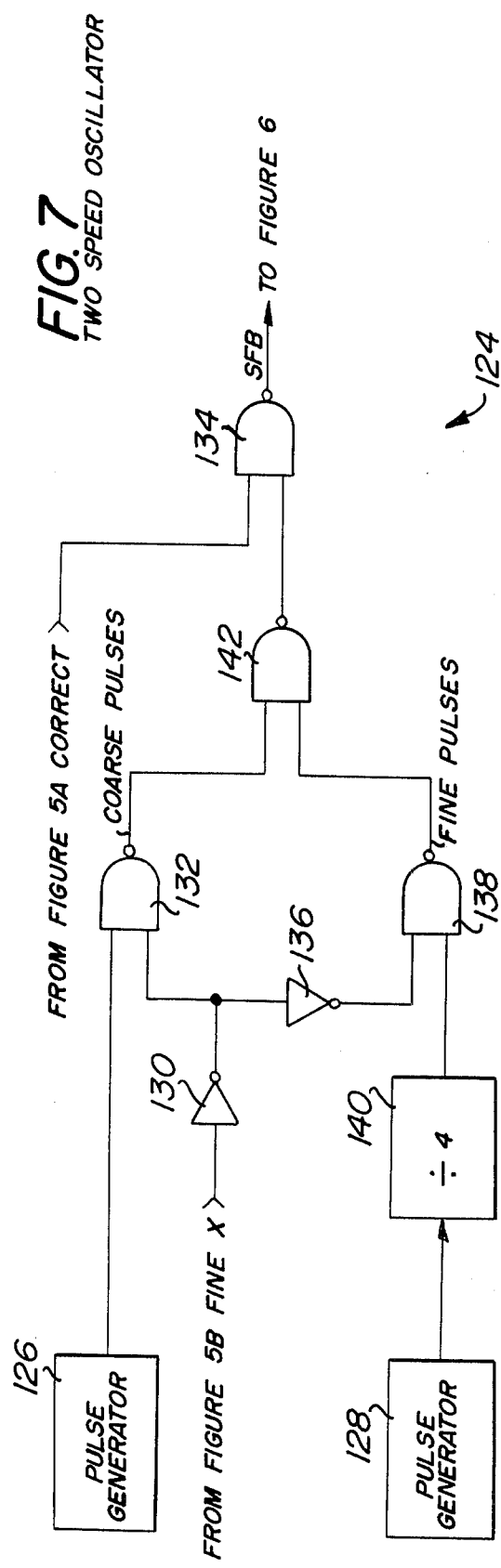

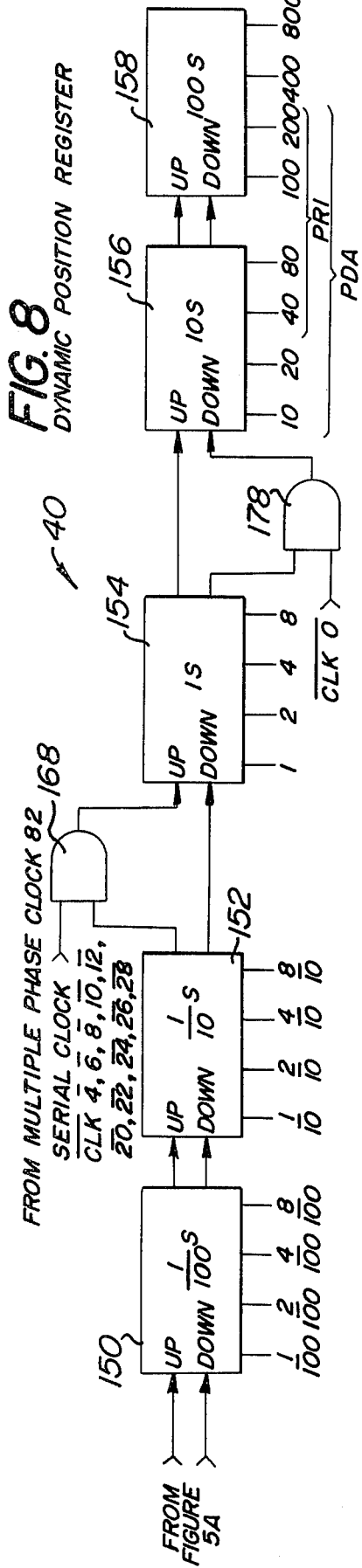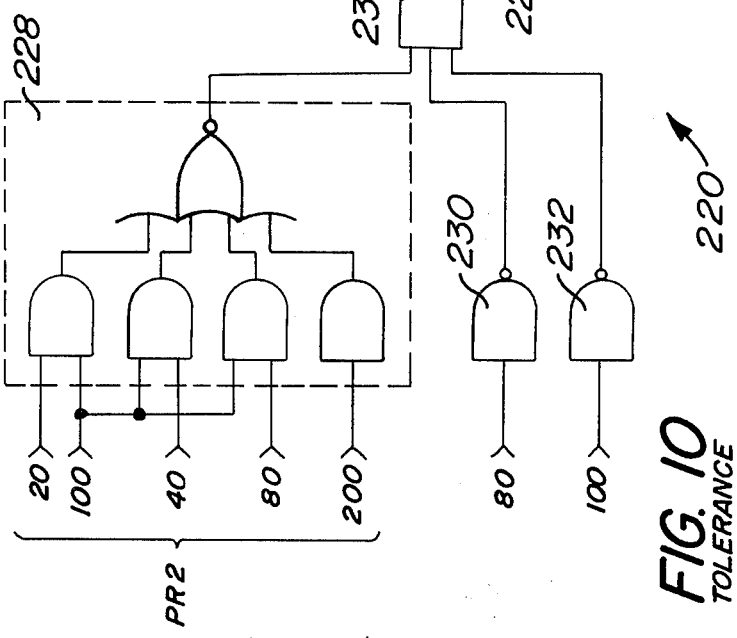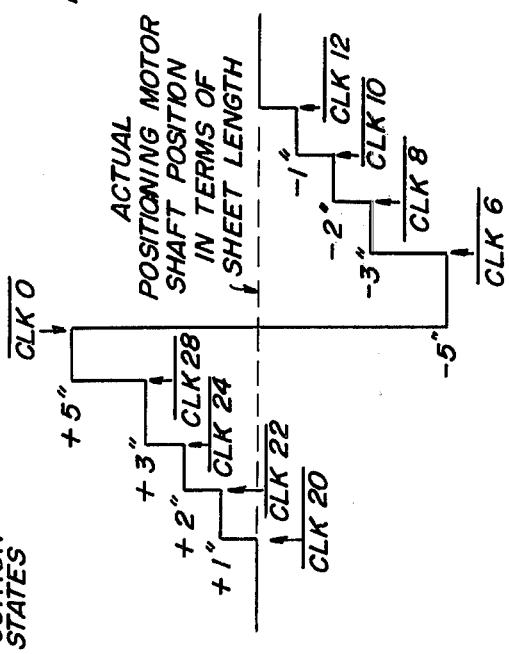

SERIAL CLOCK POSITION OF
MULTIPLE PHASE CLOCK 82

PARALLEL MULTIPLE PHASE
CLOCK SIGNALS

DIGITAL CUT-OFF CONTROL

BACKGROUND OF THE INVENTION

The present invention relates to a method and apparatus for automatically controlling the length of sheets cut from a moving web of corrugated material.

In particular, the invention relates to a method and apaparatus for dynamically determining coarse errors in sheet length which are rapidly corrected at high speed by a positioning motor coupled to a variable speed transmission. Fine errors in sheet length are corrected by the positioning motor at a slower speed. The non-linear relationship between positioning motor shaft position and sheet length correction is automatically compensated for without sensing rotation of the positioning motor shaft.

In the manufacture of corrugated board, a moving web of corrugated material is repetitively severed by rotating cutting knives. The speed of the web and the speed of the cutting knives ultimately determines the length of the sheets being cut. A variable speed transmission drives the cutting knives at a fraction of the web speed. A positioning motor adjusts the variable speed transmission to correct for errors in sheet length.

It is desirable to separate sheet length errors into two groups, coarse and fine, depending upon the lengths of the sheets being cut. Thus, a fixed error in sheet length may be viewed as coarse for a short sheet but fine for a long sheet. If a two speed positioning motor is employed, the coarse error can be corrected rapidly at a high speed while the fine error can be corrected at a somewhat slower speed. In this manner, sheet length error correction can be effected accurately in a minimal time period.

In correcting for a fixed sheet length error, the number of turns of the positioning motor shaft varies non-linearly with the length of the sheet being cut. Thus, in correcting the same error, the positioning motor shaft must be driven a greater number of turns for shorter sheets than for longer sheets. This is due primarily to the non-linear characteristic of the variable speed transmission.

The non-linear relationship between rotative displacement of the positioning motor shaft and resulting correction in sheet length error can be compensated for by regulating the charging time of a capacitor through a series of adjustable potentiometers to effect incremental changes in sheet length. This technique is relatively slow and inaccurate. An alternative method is to actually sense the rotative displacement of the positioning motor shaft and process this information through a feedback loop in the cut-off control. This involves the use of expensive auxiliary detection equipment such as optical shaft encoders and the like. In such a system, the speed of correction of the error is fixed by the pulse repetition frequency of the pulses generated by the encoder.

Prior art cut-off controls which compensate for the non-linear characteristic of the variable speed transmission are disclosed in U.S. Pat. Nos. 3,324,751, 3,411,388, 3,668,957 and 3,608,411.

An advantage of the present invention is that coarse errors in sheet length can be rapidly detected by dynamically operating a position register indicative of the rotative displacement of the positioning motor shaft.

An another advantage of the invention is that the non-linear relationship between sheet length correction and turns of the positioning motor shaft is automatically compensated for in correcting for coarse and fine errors in sheet length without sensing the actual displacement of the positioning motor shaft.

A further advantage of the invention is that coarse errors are corrected rapidly at a high speed while fine errors are corrected at a slower speed.

A still further advantage of the invention is that error detection and correction is accomplished digitally, over a minimal time interval and with increased accuracy and reliability.

Other advantages will appear hereinafter.

BRIEF SUMMARY OF THE INVENTION

An improved cut-off control for operating a cut-off mechanism including a positioning motor having a shaft operatively associated with a variable speed transmission and one or more cutting knives to cut sheets of uniform length from a moving web. The cut-off control comprises means for computing actual sheet length and sheet length error and for generating separate signals indicative thereof and digital means for storing the actual sheet length signal. Digital means cyclically increment and decrement the stored actual sheet length signal. Digital means determine whether the sheet length error is within prescribed limits of the uniform sheet length in response to the cyclically incremented and decremented actual sheet length signal. A positioning motor corrects the sheet length error if it is determined to be outside the prescribed limits. Digital means simulate the correction of sheet length error effected by the positioning motor and reduce the stored sheet length error signal and correct the stored actual sheet length signal as functions thereof.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 3 is an electrical schematic of the mode circuit.

FIGS. 4A, B and C comprise an electrical schematic of the fine control gating.

FIGS. 5A and B comprise an electrical schematic of the direction sensing and coarse limits circuit.

FIG. 6 is an electrical schematic of the programmable divider.

FIG. 7 is an electrical schematic of the two speed ocillator.

FIG. 8 is an electrical schematic of the dynamic position register.

FIG. 9 is a timing diagram showing the states of the dynamic position register.

FIG. 10 is an electrical schematic of the tolerance circuit.

DETAILED DESCRIPTION OF THE INVENTION

Figure 1:
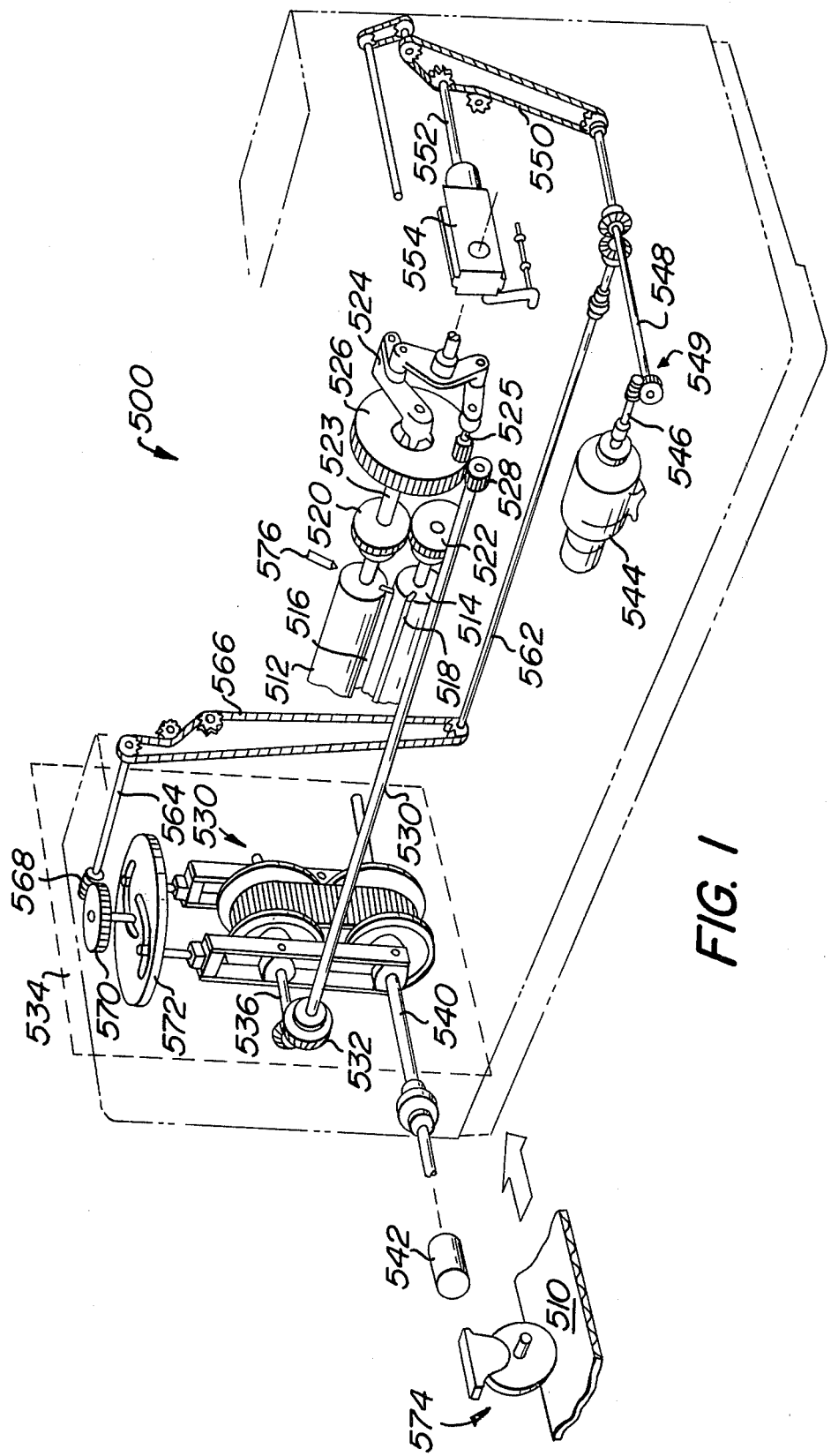
FIG. 1 is a cut-away view of a cut-off mechanism.

Referring to the drawings in detail wherein like numerals indicate like elements, there is shown in FIG. 1 a cut-off mechanism 500 for cutting moving web material 510 into uniform sheet lengths.

The cut-off mechanism 500 includes cylindrical supports 512 and 514 for cutting knives 516 and 518, respectively. While a pair of cutting knives is shown to effect a cutting action on the web, one knife and an anvil may be used for the same purpose. The supports 512 and 514 are coupled together by gears 520 and 522 to cause the supports to rotate in opposite directions.

Support 512 is coupled directly to a cyclic mechanism 524 by way of shaft 523. The cyclic mechanism 524 may be any one of a variety of cyclic mechanisms known to those skilled in the art. In FIG. 1, a crank and slider type mechanism such as the one disclosed in U.S. Pat. No. 3,745,865 is shown.

An input gear 526 surrounds shaft 523 and is coupled by way of member 525 to the cyclic mechanism. Gear 526 meshes with a pinion 528 on a main drive shaft 530 which extends transversely across the cut-off mechanism.

The end portion of main drive shaft 530 remote from pinion 528 includes a bevel gear 532 which is part of a variable speed transmission 534. The transmission 534 is connected to the output shaft 536 of a variable speed drive 538. Drive 538 is preferably a conventional Reeves drive having an input shaft 540 connected to a drive motor 542.

The variable speed drive 538 may be of the type corresponding to the variable speed transmission designated by the numeral 24 in U.S. Pat. No. 1,897,867. The function of the drive 538 is to drive the cutting knives 516 and 518 at a predetermined ratio of the speed of the web. The length of the sheets cut from the web is determined by the speeds of the web and the cutting knives. Drive 538 includes two pairs of pulleys made of opposed conical disks provided with a belt therebetween for transmitting power. To change the speed ratio, hence sheet length, one pair of conical disks is separated as the other pair is converged. This alters of the effective diameters of the pulleys and the ratio of the speed of the cutting knives to the speed of the web.

The cyclic mechanism 524 is operatively interposed between the variable speed drive 538 and the cutting knife support 512. The purpose of the cyclic mechanism is to decelerate and accelerate the cutting knife so that it travels one revolution between cuts and moves at web speed at the instant of cut. The cyclic mechanism 524 is associated with a guide block 554 which provides for the speed adjustment of the cyclic mechanism.

There are definite settings of cyclic mechanism 524 and variable speed drive 538 for each sheet length cut from the web. These settings are effected simultaneously and synchronously by positioning motor 544. Positioning motor 544 has an output shaft 546 connected to a shaft 548 by a worm reducer 549. Shaft 548 is connected to an adjustment shaft 552 by way of an endless member 550 such as a chain extending around sprockets on the shafts. Rotation of shaft 552 is accomplished by selective operation of positioning motor 544. Rotation of shaft 548 moves shaft 552 and guide block 544 in one direction to effect a reduction in the lengths of sheet being cut or in an opposite direction to effect an increase in the lengths of sheets being cut.

The shaft 548 is also coupled to by means of beveled gears to a transverse shaft 562. Shaft 562 is connected to a shaft 564 by an endless member 566 such as a chain extending around sprockets on the shafts. Shaft 564 is connected to a worm 568 meshed with a worm wheel 570. Worm wheel 570 adjusts the rotative disposition of a cam 572. The cam 572 directly adjusts the relative position of the pairs of disks in a known manner to increase or decrease the output speed from drive 538.

A cut-off mechanism comprising each of the above components is described in further detail in pending application Ser. No. 528,385, now U.S. Pat. No. 3,962,942, assigned to the same assignee as the instant application, Molins Machine Company Inc.

Detection of the speed of the web 510 is accomplished by a measuring wheel 574 which is a rotary transducer element driven by the web. Typically, the measuring wheel produces a digital pulse MW for each 0.01 inches of web. Detection of the speed of the cutting blades 516 and 518 is accomplished by knife encoder 576 which is an impulse transducer such as a magnetic pick-up or the like. Knife encoder 576 generates a digital pulse KE for each revolution of a cutting blade. The signals generated by measuring wheel 574 and knife encoder 576 are used to compute the sheet length cut from the web. The positioning motor 544 varies the speed of the cutting blades to effect the desired adjustment in sheet length.

Figure 2:
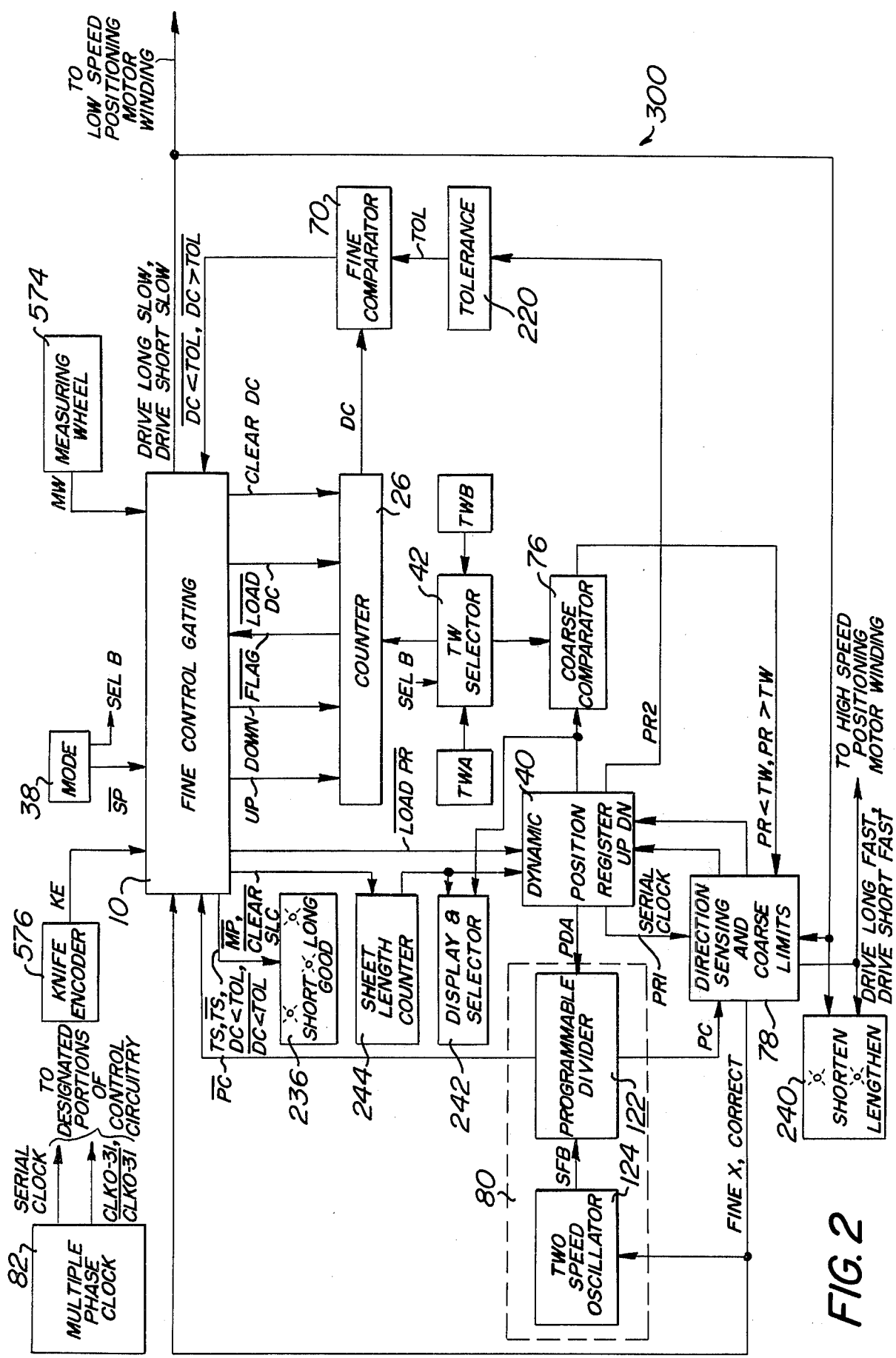
FIG. 2 is a block diagram of the cut-off control of the present invention.

In FIG. 2, there is shown a block diagram of the cut-off control of the present invention, designated generally as 300. The cut-off control 300 regulates the speed of one of the cutting knives to obtain uniform length sheets. An identical cut-off control regulates the speed of the other cutting knife. Cutoff control 300 operates according to a current program referred to as program A, and a succeeding program, referred to as program B. In program A, the current sheet length order is set into the control and the control operates positioning motor 544 to obtain uniform sheet lengths according to the current order. In program B, the operator sets the next sheet length order into the control and the control operates the positioning motor to obtain uniform sheet lengths according to the new sheet length order.

The operation of control 300 in both programs A and B is the same. In each program, the control operates in a coarse and fine mode. Coarse errors are rapidly determined by a novel technique in which a position register 40 which indicates the rotative displacement of positioning motor shaft 546 is dynamically incremented and decremented. Both coarse and fine error corrections are tracked by a simulate transmission correction circuit 80 which simulates the correction in sheet length arising from the corrective displacement of positioning motor shaft 546.

Operation of the cut-off control 300 is described in greater detail below.

PROGRAM A

In program A, the operator sets the current sheet length order by manipulating thumb wheel switches A, denoted TWA. See FIG. 2. The shaft cycle A switch in mode circuit 38 is then depressed. See FIGS. 2 and 3.

When the start cycle A switch is depressed, it triggers synchronizer 44. Synchronizer 44 generates a digital pulse in response to consecutive $\overline{CLK\ O}$ pulses appearing at its input. The $\overline{CLK\ O}$ pulses are generated by a multiple phase clock 82 which generates a plurality of parallel clock signals, denoted CLK O-CLK 31, and their complements, denoted $\overline{CLK\ O}$-$\overline{CLK\ 31}$. The parallel clock signals are approximately 250 nanoseconds long at a pulse repetition frequency of approximately 62.5 Khz. The parallel clock signals are identical in amplitude, pulse width and pulse repetition frequency but are consecutively offset at a predetermined number of degrees in phase. The sequence in which the parallel clock signals are generated is indicated by their numerical designations. See FIG. 11B. The parallel clock signals are used to synchronize the operation of cut-off control 300 as will be described in greater detail below. The multiple phase clock is particularly important in dynamically operating position register 40 to determine coarse errors.

The output of synchronizer 44 triggers a one shot 46 which generates a $\overline{SP}$ pulse at the input to fine control gating circuit 10. See FIG. 4A. The $\overline{SP}$ pulse is used by fine control gating circuit 10 to operate counter 26 to compute the sheet length error. Counter 26 is loaded with the thumb wheels A setting by the $\overline{SP}$ signal.

The actual length of a sheet being cut by cutting knives 516 and 518 is computed by sheet length counter 244. See FIG. 2. As the actual sheet length is computed by counter 244, counter 26 is decremented to provide an indication of the difference between the thumb wheels A setting, which indicates the current sheet length order, and the actual sheet length as computed by counter 244.

MEASUREMENT OF ACTUAL SHEET LENGTH AND SHEET LENGTH ERROR

The fine control gating circuit 10 loads counter 26 with the thumb wheels A setting, increments sheet length counter 244 to provide an indication of the length of the sheet being cut by the cutting knives, and simultaneously decrements counter 26 to provide an indication of the sheet length error, all in response to the MW pulses generated by measuring wheel 574, the KE pulse generated by knife encoder 576, and the $\overline{SP}$ pulse generated by mode circuit 38.

Typically, measuring wheel 574 generates one MW pulse in response to the movement of 0.01 inches of web 510. In a given interval of time, the number of MW pulses generated represents the length of the web.

Each KE pulse generated by knife encoder 576 represents a single revolution of the cutting knife associated with the knife encoder. Thus, each KE pulse indicates that a sheet has been cut from the moving web. The number of MW pulses occurring between successive KE pulses therefore provides an indication of the length of the sheet cut by the cutting knives.

Each MW pulse triggers synchronizer 12, causing the synchronizer to generate a MP pulse in response to a CLK 9 pulse from the multiple phase clock. The CLK 9 pulses occur at a pulse repetition frequency of approximately 62.5 Khz which is much greater than the pulse repetition frequency of the MW pulses which is determined by the speed of the web. Each MP pulse is inverted by NAND gate 15 and fed to sheet length counter 244. The inverted MP pulses, denoted $\overline{MP}$, increment counter 244 to provide an indication of the actual length of the sheet being cut.

The $\overline{SP}$ signal is reflected through NAND gate 48, NOR gate 50, NAND gate 52 and NOR gate 54 to set a set-reset circuit 56. See FIG. 4A. This causes the MES output of set-reset circuit 56 to disable NOR gates 22 and 28 which prevents the fine control gating circuit from incrementing or decrementing counter 26 until a KE pulse is generated by the knife encoder.

Each KE pulse triggers a synchronizer 18, causing the synchronizer to generate a $\overline{KP}$ signal at its complementary output in response to successive $\overline{CLK\ 0}$ pulses. The $\overline{KP}$ pulse resets set-reset circuit 20, causing the set-reset circuit to disable NAND gate 14 and enable NAND gate 16 so that the MP pulses can be ultimately passed to the down terminal of counter 26. The synchronizer 18 also generates a KP pulse which is an inverted replica of the $\overline{KP}$ pulse.

The KP pulse enables a NAND gate 88 to invert a CLK 19 pulse and pass the inverted pulse, in the form of a $\overline{Clear\ SLC}$ signal, to clear sheet length counter 244. See Fig. 4B.

The $\overline{KP}$ pulse in conjunction with a $\overline{CLK\ 17}$ pulse resets the set-reset circuit 56 through NOR gate 58 and NAND gate 60. See FIG. 4A. When reset, the set-reset circuit enables NOR gate 62 which generates a high KPM pulse during the $\overline{KP}$ signal. This enables NAND gate 64 to transmit a $\overline{Load\ DC}$ signal is response to a CLK 19 pulse to load counter 26 with the thumb wheels A setting.

In addition to enabling NOR gate 62, set-reset circut 56 simultaneously enables NOR gates 22 and 28. Accordingly, the MP pulses are passed through NAND gate 16, NOR gate 22 and NOR gate 24 to the down terminal of counter 26. Counter 26 is therefore decremented by the MP pulses from the thumb wheels A setting. Simultaneously, the sheet length counter 244 is incremented by the $\overline{MP}$ pulses.

If the sheet being measured is too short, counter 26 is decremented by the MP pulses until the next KE pulse from the knife encoder. If, on the other hand, the sheet is too long, counter 26 is decremented by the MP pulses to zero and the counter generates a $\overline{Flag}$ pulse. The $\overline{Flag}$ pulse sets the set-reset circuit 20 thereby steering the MP pulses through NAND gate 14, NOR gate 28 and NAND gate 30 to the up terminal of counter 26. The MP pulses then increment counter 26 until the next KE pulse is generated by the knife encoder. The contents of counter 26 at the time the next KE pulse is generated represent the error in sheet length. The contents of sheet length counter 244 at the time the next KE pulse is generated represent the actual sheet length.

When the sheet length counter 244 and the counter 26 have measured the actual sheet length and the sheet length error, respectively, the KPM signal cause NAND gates 66 and 68 to enable NAND gate 74 in response to a $\overline{CLK\ 3}$ pulses. When enabled, NAND gate 74 generates a $\overline{Load\ PR}$ signal in response to a CLK 17 pulse. The actual sheet length indicated by counter 244 is loaded into dynamic position register 40 by the $\overline{Load\ PR}$ signal.

The position register 40 is dynamically incremented and decremented by the Serial clock pulse stream generated by multiple phase clock 82. See FIG. 8. The position register provides an indication of the actual position of the positioning motor shaft 546 in terms of sheet length. The operation of the position register in determining a coarse error is described in detail below.

DETERMINATION OF COARSE ERROR

The position register 40 is dynamically incremented and decremented to determine whether the actual position of the positioning motor shaft 546 is within prescribed limits of the desired position. If more than one turn of the positioning motor shaft is required to correct for sheet length error, it is determined that a coarse error exists. The number of turns of the positioning motor shaft required to effect sheet length correction is a non-linear function of the length of the sheet being cut. The non-linearity is due primarily to the characteristic of variable speed transmission 534.

Fewer turns of the positioning motor shaft are required to effect a given change in sheet length for longer sheets than for shorter sheets. Thus, one turn of the positioning motor shaft will effect a greater change in sheet length for longer sheets than for shorter sheets. For shorter sheets, relatively small errors in sheet length may be characterized as coarse, whereas for longer sheets the same errors may not be characterized as coarse. The characterization of a sheet length error as coarse is accomplished by dynamically or cyclically incrementing and decrementing position register 40 and simultaneously comparing the contents of the position register to the thumb wheels A setting. As used herein after, the terms dynamically and cyclically are synonymous.

The serial clock output of multiple phase clock 82 cyclically increments the position register. The serial clock output comprises the $\overline{CLK\ 4, 6, 8, 10, 12, 20, 22, 24, 26}$ and $\overline{28}$ pulses. These pulses are passed in sequence to the up terminal of ones stage 154 of position register 40 by AND gate 168. See FIG. 8. Each pulse increments the ones stage of one count. One count of the ones stage of the position register represents 1 inch of sheet length.

Figure 11A:
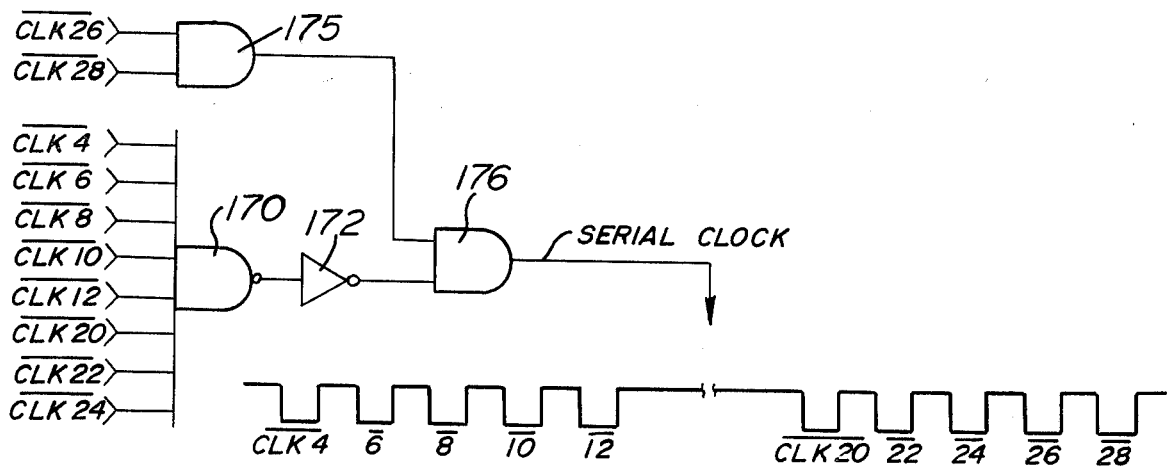
FIG. 11A is an electrical schematic of the serial clock portion of the multiple phase clock.
Figure 11B:
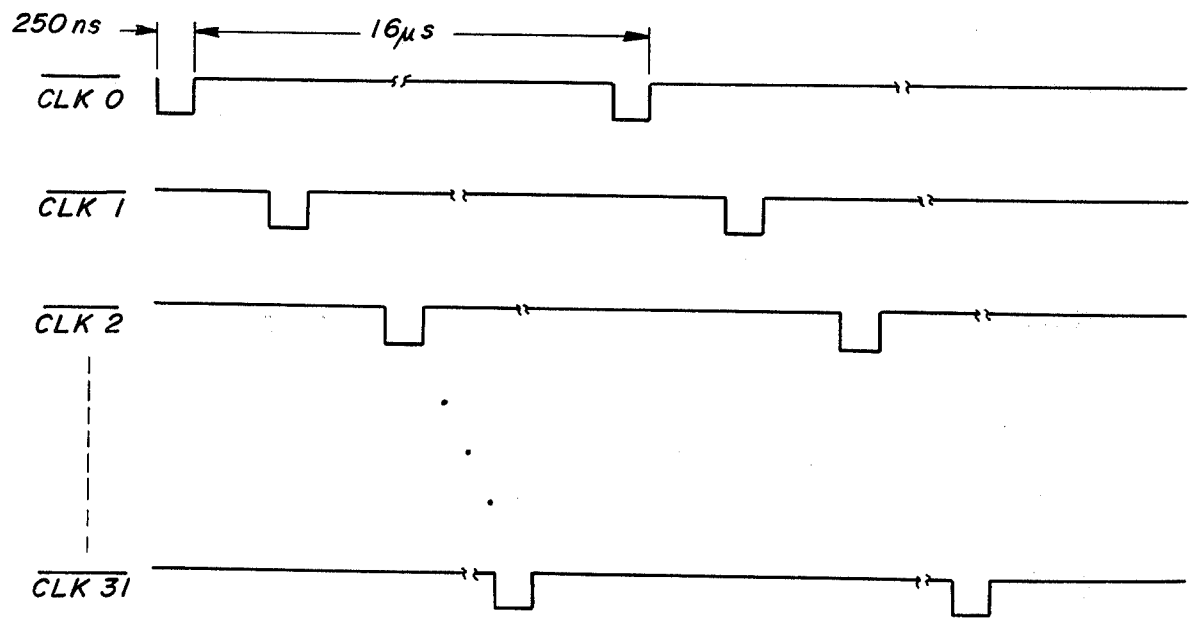
FIG. 11B is a timing diagram of the multiple phase clock parallel output signals.

The portion of the multiple phase clock 82 which generates the serial clock signal at the input to AND gate 168 is shown in FIG. 11A. The $\overline{CLK\ 4, 6, 8, 10, 12, 20, 22}$, and $\overline{24}$ signals are combined at the parallel inputs to NAND gate 170 to form a stream of serial pulses at the NAND gate output. The stream of serial pulses is inverted by inverter 172. The CLK 26 and CLK 28 pulses are combined at the parallel inputs to AND gate 174 to provide another stream of serial pulses at the input to AND gate 176. The streams of pulses generated by AND gate 174 and inverter 172 are combined by AND gate 176 to produce a stream of negative going serial pulses denoted as the serial clock signal. See FIG. 11A.

The $\overline{CLK\ 0}$ pulses generated by the multiple phase clock are passed by AND gate 178 to cyclically decrement the tens stage 156 of the position register. One count of the tens stage represents 10 inches of sheet length.

Specifically, $\overline{CLK\ 20, 22, 24}$ and $\overline{28}$ pulses increment the position register 1, 2, 3 and 5 inches above the actual position of positioning motor shaft in terms of sheet length. See FIG. 9. The actual position of the positioning motor shaft in terms of sheet length is hereinafter referred to as actual sheet length. The $\overline{CLK\ 0}$ pulse then decrements the position register ten inches so that the position register is five inches below the sheet length. Thereafter, the $\overline{CLK\ 6, 8, 10,}$ and $\overline{12}$ pulses increment the position register so that the register is 3, 2, 1 and none inches below the actual sheet length. The sequential states of the position register as it is being cyclically incremented and decremented with respect to the actual sheet length are indicated in FIG. 9.

The number of inches that the position register is incremented above or decremented below the actual sheet length is combined with the sense of the sheet length error to determine whether a coarse error exists. As the position register is being cyclically varied by the $\overline{CLK\ 0}$ and serial clock pulses, it indicates the apparent position of the positioning motor shaft, in terms of sheet length, which would be obtained if the positioning motor shaft were rotated to the cyclically varied position register reading. The apparent position of the positioning motor shaft in terms of sheet length is hereinafter referred to as apparent sheet length. The apparent sheet length is indicated by the PR 1 outputs of the position register. See FIGS. 5A and 8.

The PR 1 outputs are decoded by BCD to decimal decoder 180 to indicate whether the apparent sheet length is less than 40 inches, between 40 and 100 inches, between 100 and 180 inches or greater than 180 inches. Direction sensing and coarse limits circuit 78 combines this information with the outputs of coarse comparator 76 and groups 1 and 2 of the parallel clock outputs of multiple phase clock 82 to determine whether a coarse error exists. See FIG. 5A. In particular, gating circuits 182 and 184 determine whether a coarse error exists and operate the high speed winding of the positioning motor accordingly.

Gating circuits 182 and 184 are shown in greater detail in FIG. 5B. AND-OR-INVERT circuit 186 combines the group 1 parallel clock bits, CLK 3, 7, 9 and 11, with the outputs of BCD to decimal decoder 180 to determine whether a coarse long error exists.

At $\overline{CLK\ 3}$ time, the apparent sheet length indicated by the position register is 5 inches below the actual sheet length. See FIG. 9. If the apparent sheet length is greater than 180 inches at this time, AND-OR-INVERT circuit 186 generates a pulse output to indicate this condition. Similarly, AND-OR-INVERT circuit 186 indicates the conditions that the apparent sheet length is 3 inches below the actual sheet length at $\overline{CLK\ 7}$ time when the apparent sheet is between 100 and 180 inches; that the apparent sheet is 2 inches below the actual sheet length when the apparent sheet length is between 40 and 100 inches at $\overline{CLK\ 9}$ time; and that the apparent sheet length is 1 inch below the actual sheet length at $\overline{CLK\ 11}$ time when the apparent sheet length is less than 40 inches.

The output of AND-OR-INVERT circuit 186 is reflected through inverter 188 to clock the JK flip-flop 190. If the apparent sheet length indicated by the position register reading is greater than the thumb wheels A setting at any of the above times, the PR < TW signal generated by coarse comparator 76 will be low, indicating a long coarse sheet length error, and the output of inverter 188 will drive the output of flip-flop 190 low. The output of flip-flop 190 is inverted by inverter 192 to drive the high speed winding of the positioning motor to correct for the long coarse error. The foregoing conditions are indicated in Table 1 below.

Table 1

| Dynamic States of Position Register 40 and States of High Speed Motor Winding | | | |
|---|---|---|---|
| Apparent Sheet Length Indicated By Position Register Reading Relative to Actual Sheet Length | CLK Pulse | PR>TW | PR<TW | Coarse Error |
| +1" | 21 | * | Yes | Long |
| +2" | 23 | * | Yes | Long |
| +3" | 25 | * | Yes | Long |
| +5" | 29 | * | Yes | Long |
| −5" | 3 | Yes | * | Short |
| −3" | 7 | Yes | * | Short |
| −2" | 9 | Yes | * | Short |
| −1" | 11 | Yes | * | Short |

The group 2 parallel clock bits, CLK 21, 23, 25 and 29, are combined with the outputs of BCD to decimal decoder 180 by AND-OR-INVERT circuit 194 to determine whether a coarse short error exists. The output of AND-OR-INVERT circuit 194 is reflected through inverter 196 to clock a JK flip-flop 198. If the apparent sheet length indicated by the position register is less than the thumb wheels A setting at any of these times, the PR > TW output of the coarse comparator will be low indicating a short error. Inverter 196 thereafter drives the output of flip-flop 198 low. Inverter 200 inverts the output of the flip-flop to drive the high speed winding of the positioning motor to correct for the short coarse error.

By dynamically varying the positioning register 40 as described above, the high speed winding of the positioning motor is energized only when it has been determined that the positioning motor shaft must be rotated more than a predetermined number of turns, typically one turn, to effect the desired sheet length correction. The size of the sheet length errors characterized as coarse as indicated in Table II below in connection with the apparent sheet length indicated by the position register.

Table II

| Coarse Errors | |
| --- | --- |
| Apparent Sheet Length Indicated by Position Register | Sheet Length Error TW - PR |
| >180" | >5" |
| 100–800" | >3" |
| 40–100" | >2" |
| <40" | >1" |

The high speed winding of the positioning motor is energized to correct for sheet length error only in the coarse control mode. During this time, control circuit 202 in direction sensing and coarse limits circuit 78 prevents the cut-off control from entering the fine control mode. See FIG. 5A.

Throughout the coarse control mode, either the output of flip-flop 190 or flip-flop 198 is low to cause the high speed winding of the positioning motor to be energized. See FIG. 5B. If the output of flip-flop 190 is low, then the output of flip-flop 198 is high, and vice versa. Accordingly, the complementary output of one of the flip-flops is low during the coarse control mode. This disables NAND gate 204, keeping the D input of flip-flop 206 high. A CLK 31 pulse clocks the flip-flop 206, causing its output to go high in response to the high D input. The output of flip-flop 206 is inverted by NOR gate 208 to generate a low Fine X signal. The low Fine X signal indicates that the cut-off control is in the coarse control mode, that is, that the cut-off control is correcting a coarse error by rotating the positioning motor shaft 546 at high speed.

The low Fine X signal also disables NAND gate 60 in the fine control gating circuit 10. See FIG. 4A. Accordingly, set-reset circuit 56 keeps NOR gates 22 and 28 disabled so that counter 26 is prevented from measuring a new error in sheet length while coarse correction takes place.

The low Fine X signal also controls the pulse repetition frequency of the pulses generated by the two speed oscillator 124 in simulate transmission correction circuit 80. See FIGS. 2 and 7. The simulate transmission correction circuit 80 generates a stream of PC pulses which simulate the correction in sheet length effected by rotation of the positioning motor shaft 546. In particular, simulate transmission correction circuit 80 automatically compensates for the non-linear relationship between shaft length correction and turns of the positioning motor shaft.

SIMULATE TRANSMISSION CORRECTION

During correction in the coarse control mode, the simulate transmission correction circuit 80 generates a pair of signals, PC and $\overline{PC}$ indicative of the correction in sheet length due to the rotation of the positioning motor shaft. The PC and $\overline{PC}$ signals are inverted replicas of each other. The PC signal is used by the direction sensing and coarse limits circuit 78 to increment or decrement the position register to update the actual sheet length indicated by the positiong register. The $\overline{PC}$ signal is used by the fine control gating circuit 10 to decrement the error indicated by counter 26 during correction.

In the coarse control mode, the direction sensing and coarse limits circuit 78 generates a high Correct signal which indicates that the positioning motor shaft 546 is being rotated. See FIG. 5A. Thus, when the positioning motor shaft is being rotated, either gating circuit 82 generates a drive short fast signal to disable NOR gate 110 or gating circuit 184 generates to drive long fast signal to disable NOR gate 114. If either NOR gate is disabled, it in turn disables NAND gate 116, causing the NAND gate to generate a high Correct signal.

If a long coarse error is being corrected, NOR gate 110 presets flip-flop 112 in response to the drive short fast signal. When preset, flip-flop 112 enables NAND gate 118 and disables NAND gate 120. See FIG. 5A. The output of NAND gate 118 clocks the down terminal of the position register in response to the PC pulses generated by programmable divider 122 in the simulate transmission correction circuit. See FIG. 6. If a short coarse error is being corrected, NOR gate 114 clears flip-flop 112 in response to the drive long fast signal. When cleared, flip-flop 112 enables NAND gate 120 and disables NAND gate 118. The output of NAND gate 120 clocks the up terminal of the position register in response to the PC pulses.

The programmable divider 122 generates the PC pulses in response to the SFB pulses generated by the two speed oscillator circuit 124 in the simulate transmission correction circuit. See FIGS. 6 and 7. The two speed oscillator includes a pair of identical pulse generators 126 and 128. See FIG. 7. The pulse generators are free-running and are not actuated in response to the rotation of the positioning motor shaft 546 by a feedback transducer signal or the like. In the coarse control mode, the low Fine X signal is inverted by inverter 130 to enable NAND gate 132. The pulses generated by pulse generator 128 are reflected through NAND gate 132 and NAND gate 142 to the input of NAND gate 134. The high Correct signal enables NAND gate 134 to generate a stream of SFB pulses in response to the pulses generated by pulse generator 126.

The SFB pulses clock presettable counter 144 in programmable divider 122. See FIG. 6. The presettable counter is preset by the outputs of read-only memory 146. Read-only memory 146 is preprogrammed to compensate for the non-linear relationship between sheet length correction and turns of the positioning motor shaft. The non-linear relationship may be due to a variety of factors well known in the art. Primarily, the relationship arises from the non-linear characteristic of the variable speed transmission 534.

The read-only memory is addressed by the output of BCD to binary decoder 148. The BCD to binary decoder decodes the PDA output of the position register 40. The PDA output indicates the positioning motor shaft position in terms of sheet length. The position register preferably comprises five stages, a hundredths stage 150, a tenths stage 152, a ones stage 154, a tens stage 156 and a hundreds stage 158. Each stage has four BCD outputs. The 10, 20, 40 and 80 outputs of the tens stage and the 100 and 200 outputs of the hundreds stage comprise the PDA signal.

When presettable counter 144 counts a prescribed number of SFB pulses, it generates an output signal which triggers a synchronizer 161, causing the synchronizer to pass a CLK 13 pulse at its PC output. The output of the read-only memory 146 is based upon information stored therein at a particular address addressed by decoder 148. The information is such that the presettable counter 144 causes synchronizer 162 to generate a PC pulse only after enough SFB pulses have been counted to indicate that the positioning motor shaft has been rotated to cause a uniform change in sheet length. Preferably, the uniform change in sheet length is 0.01 inches. Thus, the rate at which the PC pulses are generated depends upon the number to which the presettable counter is preset by the read-only memory and the pulse repetition frequency of the SFB pulses.

In the coarse control mode, the counter 26 and position register 40 are clocked by the $\overline{PC}$ and PC pulses respectively at CLK 13 times only. See FIG. 6. The PC pulses do not dynamically vary the position register. Thus, the PC pulses are to be contrasted to the $\overline{CLK\ 0}$ and serial clock inputs to the position register. Although the position register is continuously varied in a dynamic mode throughout the coarse control mode, at CLK 13 time the position register reading is returned to the actual position of the positioning motor shaft in terms of sheet length. In comparison, at the serial clock pulse times, the position register reading reflects the apparent position of the positioning motor shaft in terms of sheet length. Accordingly, at CLK 13 times, the PC pulses increment or decrement the position register to provide an indication of the actual sheet length during error correction.

In the coarse control mode, counter 26 is decremented and position register 40 is incremented or decremented until it is determined that the sheet length error is no longer outside the coarse limits set forth in Table II above. At this time, if the position register reading is less than the thumb wheels A setting when AND-OR-INVERT circut 86 generates an output pulse, the J input to flip-flop 190 will be high. See FIG. 5B. Accordingly, the output of flip-flop 190 will be driven high, preventing inverter 192 from energizing the high speed motor winding. Similarly, if the position register reading is greater than the thumb wheels A setting when AND-OR-INVERT circuit 194 generates a pulse output, flip-flop 198 will prevent inverter 200 from energizing the high speed motor winding. These conditions are indicated in Table III below.

Table III

| Coarse Limits | |
|---|---|
| Position Register Reading | TW - PR |
| >180 | <5" |

Table III-continued

| Coarse Limits | |
|---|---|
| Position Register Reading | TW - PR |
| 100–180 | <3" |
| 40–100 | <2" |
| <40 | <1" |

These conditions indicate that the number of turns which the positioning motor shaft must be rotated to effect the desired error correction is within the coarse limits. Accordingly, the cut-off control can leave the coarse control mode and finish the sheet length correction in the fine control mode.

FINE CONTROL MODE

When the direction sensing and coarse limits circuit determines that the number of turns of the positioning motor shaft required to reach the thumb wheels A setting is within the coarse limits, the complementay outputs of flip-flop 190 and 198 will be driven high since the PR < TW and PR > TW signals will be low as the position register is dynamically varied. See FIG. 5B. Accordingly, the output of NAND gate 204 is low so that a CLK 31 pulse generated by multiple phase clock 82 causes flip-flop 206 to generate a low output signal. The output of flip-flop 206 is inverted by NOR gate 208 which generates a high Fine X signal. This indicates the cut-off control is in the fine control mode.

In the fine control mode, counter 26 is decremented by the MP pulses until a short error is reduced to zero or a long error is brought within a preselected tolerance band. The fine control gating circuit 10 drives the low speed winding of the positioning motor to correct for sheet length error. In addition, the direction sensing and coarse limits circuit 78 increments or decrements the position register in response to the simulate transmission correction circuit 80. The simulate transmission correction circuit simulates change in sheet length according to the predicted rotation of the positioning motor shaft during error correction.

As counter 26 is being decremented, its contents are continuously compared by fine comparator 70 to a tolerance signal TOL. See FIG. 2. The tolerance setting TOL may be varied to correspond to longer or shorter sheet lengths.

The TOL signal is generated by tolerance circuit 220. The length of the sheet being cut is indicated by the PR 2 outputs of position register 40. See FIGS. 2 and 10. The tolerance circuit determines whether the sheet length is above or below a preselected number, preferably 80 inches, and selects a long or short tolerance band accordingly.

Tolerance circuit 220 includes long and short tolerance switches 222 and 224 connected to a tolerance selector 226. See FIG. 10. The short and long tolerance swithces 222 and 224 are preset to the desired tolerance settings. Tolerance selector 226 generates the TOL signal for purposes of comparison to the sheet length error indicated by counter 26. An AND-OR-INVERT circuit 228 and NAND gates 230, 232 and 234 combine the PR 2 outputs of position register 40 to generate a TOL SEL signal for purposes of controlling the tolerance selector. If the PR 2 signals indicate that the sheet length is greater than 80 inches, NAND gate 234 generates a high TOL SEL signal, causing tolerance selector 226 to generate a TOL signal indicative of the long tolerance switch setting. If the PR 2 outputs of the position register indicate the sheet length is less than 80 inches, NAND gate 234 generates a low TOL SEL signal. This causes the tolerance selector 226 to generate a TOL signal indicative of the short tolerance switch setting.

The contents of counter 26 are indicated by the signal DC. See FIG. 2. The contents of the counter represent the sheet length error. If the error is outside the tolerance band, the DC signal will be greater than the TOL signal. The fine comparator 70 indicates this by generating a high $\overline{DC < TOL}$ signal. This enables NAND gate 84 in the fine control gating circuit 10 to generate a low signal in response to the KPM and CLK 11 signals. See FIG. 4B. The low output of NAND gate 84 enables NOR gate 86 to respond to the TS input signal. The TS signal is generatated by set-reset circuit 90 in response to NAND gate 88 and the CLK 19 and KP signals.

The CLK 19 and KP signals cause NAND gate 88 to set the set-reset circuit 90. The set-reset circuit generates a high TS signal in response. NAND gate 91 generates a low $\overline{short\ error}$ signal in response to the KPM and CLK 11 signals. This indicates that the sheet is too short.

In the fine control mode, the fine control gating circuit 10 generates a drive long slow signal to actuate the low speed winding of the positioning motor only if two successive short sheets are detected. This is accomplished by the error detect portion 92 of the fine control gating circuit. See FIG. 4C.

The error detect circuit 92 includes a four-bit counter 94 which is preset to the number 4. A low $\overline{short\ error}$ signal increments counter 94 by one count. If two successive short errors are detected, the second $\overline{short\ error}$ signal increments counter 94 to the number 6. The BCD to decimal decoder 96 detects the number 6 and generates a low $\overline{6\ decode}$ signal. The $\overline{6\ decode}$ signal causes AND gate 98 to drive the reset input of set-reset circuit 100 low. See FIG. 4B. This causes the output of the set-reset circuit to go low. NAND gate 102 inverts the set-reset circuit output to a high drive long slow signal. The drive long slow signal operates the low speed winding of the positioning motor causing the positioning motor shaft to rotate to correct for the short error.

It should be noted that correction of a short error takes place immediately upon detection of two successive short errors. No further conditions need be met. In contrast, long error correction does not take place until two conditions are met. First, the long error must be outside a tolerance band. Second, two such long errors must occur consecutively.

If a sheet is too long, counter 26 is decremented to zero by the MP pulses passed by NOR gate 24. See FIG. 4A. When the counter reaches zero, it generates a borrow signal, designated $\overline{Flag}$, and then counts upward in response to the MP pulse to compute the long error as previously described. The $\overline{Flag}$ signal indicates that that the counter is being incremented rather than decremented and, therefore, that the sheet is too long.

The $\overline{Flag}$ signal resets the set-reset circuit 90. See FIG. 4B. This causes the TS output of the set-reset circuit to go low. If the long error is outside the tolerance band, fine comparator 70 generates a high $\overline{DC <}$ $\overline{TOL}$ signal at the input to NAND gate 84. NOR gate 86 is enabled by the low TS signal at this time. When the KPM and CLK 11 pulses appear at the inputs of NAND gate 84, the NAND gate generates a low signal at the input to NOR gate 86. NOR gate 86 therefore generates a high output signal which is inverted by NOR gate 104 to a low $\overline{long\ error}$ signal.

The low $\overline{long\ error}$ signal decrements four-bit counter 94 one count from the preset number 4. See FIG. 4C. If a second consecutive long error outside the tolerance band is detected, a second $\overline{long\ error}$ signal decrements counter 94 to the number 2. The number 2 is detected by BCD to decimal decoder 96. The decoder generates a low $\overline{2\ decode}$ signal in response. The low $\overline{2\ decode}$ signal causes AND gate 106 to reset a set-reset circut 108. The output of the set-reset circuit therefore goes low. The set-reset ciruit output is inverted to a high drive short slow signal by NAND gate 110. The drive short slow signal operates the low speed winding of the positioning motor to cause the positioning motor shaft to rotate to correct the long error.

In the fine control mode, while the positioning motor is being operated, either the drive short slow signal disables NOR gate 110 to preset flip-flop 112 or the drive long slow signal disables NOR gate 114 to clear flip-flop 112. See FIGS. 4B and 5A. Thus, if two successive long error signals outside the tolerance band are detected, the drive short slow signal presets flip-flop 112. On the other hand, if two successive short error signals are detected, the drive long slow signal clears the flip-flop.

At the same time, the output of either NOR gate 110 or NOR gate 114 disables NAND gate 116. See FIG. 5A. When disabled, NAND NAND gate 116 generates a high correct signal. The high correct signal indicates that the low speed positioning motor winding is being operated to correct for a short or long fine error.

If a long error is detected, flip-flop 112 is preset. This enables NAND gate 118 and disables NAND gate 120. See FIG. 5A. The output of NAND gate 118 clocks the down terminal of the position register in response to the PC pulses generated by programmable divider 122 in the simulate transmission correction circuit. See FIG. 6. The programmable divider generates the PC pulses in response to the SFB pulses generated by the two speed oscillaor circuit 124 in the simulate transmission correction circuit. See FIG. 6. The programmable divider generates the PC pulses in response to the SFB pulses generated by the two speed oscillaor circuit 124 in the simulate transmission correction circuit. See FIGS. 6 and 7. During error correction in the fine control mode, the Fine X signal input to inverter 130 is high. Inverter 130 therefore disables NAND gate 132. See FIG. 7. This blocks the pulses generated by pulse generator 126 from being transmitted through NANd gate 134 to the programmable divider. The output of inverter 130 is reinverted by inverter 136 to enable NAND gate 138 to pass the output of divide by four circuit 140.

The pulses generated by pulse generator 128 are passed through the divide by four circuit 140 and transmitted through NAND gates 138, 142 and 134 to the SFB output. The SFB pulses clock presettable counter 144 in programmable divider 122 as previously described in connection with the coarse control mode.

The pulse repetition frequency of the SFB pulses in the fine control mode is approximately one-quarter the pulse repetition frequency of the pulses in the coarse control mode due to the presence of divide by four circuit 140. The pulse repetition frequency of PC pulses in the fine control mode, therefore, will be approximately one-quarter the pulse repetition frequency of the pulses in the coarse control mode. The position register 40 and counter 26 are therefore clocked in the fine control mode at approximately one-quarter the rate in the coarse control mode.

The dual frequencies permit the cut-off control to keep pace with the positioning motor. Thus, the low speed winding drives the positioning motor at approximately one-quarter the speed of the high speed winding. The low speed winding is used in the fine control mode while the high speed winding is used in the coarse control mode. Accordingly, correction is four times as fast in the coarse control mode, and the pulse repetition frequency of the PC pulses should be four times as high.

As the positioning motor shaft turns to effect the desired fine error correction, the direction sensing and coarse limits circuit 78 determines whether the position register should be incremented or decremented. If the error is long, the position register 40 and the counter 26 are counted down until the error indicatd by counter 26 is tolerable, that is, until the contents of counter 26 fall within the tolerance band. If, however, the error is short, position register 40 is counted up and counter 26 is counted down until the counter reaches zero. In effect, then, there is no tolerance for a short sheet.

If the error is long, the drive short slow signal causes flip-flop 112 to enable NAND gate 118 in the direction sensing and coarse limits circuit. See FIG. 5A. Accordingly, the PC pulses are passed by the NAND gate to count down the position register. The PC pulses simulate the change in sheet length as the positioning motor shaft rotates to correct the long fine error.

At the same time that the position register is being counted down by the PC pulses, the counter 26 is being counted down by the $\overline{PC}$ pulses. Thus, the drive short slow signal disables NAND gate 116, causing the NAND gate to generate a high correct signal. The high correct signal is reflected through NOR gate 50, NAND gate 52 and NOR gate 54 to set the set-reset circuit 56 in the fine control gating circuit. See FIG. 4A. This enables NOR gate 162 to pass the $\overline{PC}$ pulses to NOR gate 24. The output of NOR gate 24 counts down counter 26. Since the $\overline{PC}$ pulses are inverted replicas of the PC pulses, they also simulate change in sheet length as the positioning motor shaft rotates to correct the long fine error.

In correcting for a long fine error, the position register is counted down by the PC pulses in steps of 0.01 inch at CLK 13 time. At the same time, the $\overline{PC}$ pulses count down the long error stored in counter 26. When the long error falls within the tolerance band, the fine comparator 70 generates a low $\overline{DC < TOL}$ signal. See FIG. 2. This signal enables OR gate 164 in the fine control gating circuit to set the set-reset circuit 108 when a $\overline{CLK\ 16}$ pulse is generated by multiple phase clock 82. See FIG. 4B. This causes NAND gate 110 to generate a low drive short slow signal which disables the low speed winding of the positioning motor. Accordingly, the drive short slow signal no longer causes NAND gate 116 in the direction sensing and coarse limits circuit to be disabled. See FIG. 5A. The NAND gate therefore generates a low correct signal. The low correct signal disables NAND gate 134 in the two speed oscillator, preventing the NAND gate from passing any further $\overline{SFB}$ pulses. See FIG. 7. As a result, no further PC or $\overline{PC}$ pulses are generated by programmable divider 122 when the long error is within the tolerance band. See FIG. 6.

After long fine error correction, the position register indicates the actual corrected sheet length at all CLK 13 times. In addition, the contents of counter 26 indicate the residue of the long error within the tolerance band.

Operation of the cut-off control in correcting for a short fine error is similar to the operation in correcting for a long fine error. If a short error is detected, set-reset circuit 100 in the fine control gating circuit causes NAND gate 102 to generate a high drive long slow signal. See FIG. 4B. The high drive long slow signal causes NOR gate 114 in the direction sensing and coarse limits circuit to clear flip-flop 112. See FIG. 5A. Accordingly, NAND gate 120 passes the PC pulses to the up terminal rather than the down terminal of the position register. This indicates that the positioning motor shaft is rotating in the proper direction for correcting the short fine error.

The high drive long slow signal also causes NOR gate 114 to disable NAND gate 116, causing the NAND gate to generate a high correct signal. See FIG. 5A. The high correct signal causes NOR gate 50, NAND gate 52 and NOR gate 54 in the fine control gating circuit to set the set-reset circuit 56. See FIG. 4A. This enables NOR gate 162 to pass the $\overline{PC}$ pulses through NOR gate 24 to the down terminal of counter 26. The $\overline{PC}$ pulses count down the short error stored in counter 26 until the error is reduced to zero.

When the error in counter 26 is erased, that is, when the counter is counted to zero by the $\overline{PC}$ pulses, the counter generates a low $\overline{Flag}$ signal. The low $\overline{Flag}$ signal sets the set-reset circuit 100. See FIG. 4B. This causes NAND gate 102 to generate a low drive long slow signal. The low speed positioning motor winding is disabled when the drive long slow signal goes low. Accordingly, NOR gate 114 no longer disables NAND gate 116. See FIG. 5A. The NAND gate therefore generates a low correct signal.

The low correct signal disables NAND gate 134 preventing any further SFB pulses from being generated. See FIG. 7. Programmable divider 122 therefore ceases producing any further PC or $\overline{PC}$ pulses. The actual corrected sheet length is indicated by position register 40 at this time.

It should be appreciated that while a long or short error is being corrected, either in the coarse or fine control modes, the MP pulses are prevented from reaching the up or down terminals of counter 26 since set-reset circuit 56 is set in response to a high correct signal. Thus, during correction of sheet length error, counter 26 is prevented from measuring the actual length of the sheet being cut. Instead, the error stored in the counter is counted down by the $\overline{PC}$ pulses.

Whenever an error has been corrected, the correct signal goes low. Accordingly, the positioning motor shaft stops rotating and the next KE pulse generated by the knife encoder causes the MP pulses to be steered to either the up or down terminal of counter 26 through NAND gate 30 or NAND gate 24, respectively. The counter then measures the length of the sheet being cut, and an error is detected and corrected as previously described.

DISPLAYS

Display 236 comprises three separate lamps which indicate whether a sheet is short, whether it is within tolerance or good, or whether it is long and outside the tolerance band. Display 236 is operated in response to the TS, $\overline{TS}$, $\overline{DC < TOL}$ and DC < TOL signals. See FIGS. 2 and 4B. The TS signal indicates that a sheet is too short. The $\overline{TS}$ signal is a complement of the TS signal, and it indicates that the sheet length is not too short. The $\overline{DC < TOL}$ indicates that the long error is outside the tolerance band. This signal is inverted by inverter 238 to generate the DC < TOL signal. See FIG. 4B. The DC < TOL signal indicates that the long error is within the tolerance band.

If the TS signal is high, display 236 energizes the short lamp. If both the $\overline{TS}$ and $\overline{DC < TOL}$ signals are high, display 236 energizes the long lamp. If both the TS and the DC < TOL signals are high, display 236 energizes the good lamp.

Display 240 includes shorten and lengthen lamps which indicate that the sheet length error is being corrected to reduce or increase the sheet length respectively. The drive short fast and drive long fast signals generated in the coarse control mode are transmitted to display 240. The drive long slow and drive short slow signals generated in the fine control mode are also transmitted to display 240. See FIG. 2. If either the drive short slow or drive short fast signals are high, display 240 energizes the shorten lamp. If either the drive long slow or drive long fast signals are high, display 240 energizes the lengthen lamp.

Display and selector 242 displays either the contents of position register 40 or the contents of sheet length counter 244 according to the setting of an internal switch (not shown). See FIG. 2. Sheet length counter 244 indicates the actual length of a sheet being cut prior to correction of sheet length error. After correction of the sheet length error, position register 40 indicates the actual corrected sheet length. Display and selector 240 is used to display either of these quantities in response to either the sheet length counter or position register signals.

PROGRAM B

If it is desired to change the sheet length order, the thumb wheels B switches are set to the new sheet length order and the start cycle B switch in the mode circuit is depressed. See FIG. 3. This triggers synchronizer 166. Synchronizer 166 in turn causes one shot 46 to generate a low $\overline{SP}$ signal. In addition, the start cycle B switch, when depressed, sets a set-reset circuit 167, causing the set-reset circuit to generate a high SEL B signal. The SEL B signal is fed to the TW selector 42. See FIG. 2. The TW selector transmits the thumb wheel B setting to counter 26 and coarse comparator 76 in response.

The cut-off control thereafter operates in the coarse and fine control modes as previously described in connection with Program A, using the thumb wheels B setting instead of the thumb wheels A setting.

The present invention has been described in terms of various conventional digital logic elements well known in the art. It should be understood, however, that other equivalent digital components can be substituted for the elements disclosed without exceeding the spirit or scope of the invention. Additionally, although specific timing wave forms have been specified in describing the operation of the invention, it should be obvious that the wave forms can be varied according to the particular application of the invention. For example, faster or slower motors can be used to effect the desired sheet length correction and the pulse repetition frequency of the two speed oscillator pulses can be varied accordingly.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for controlling the lengths of sheets cut by one or more cutting knives from a moving web including a positioning motor having a shaft operatively coupled to a variable speed transmission for varying the speed of the cutting knives, comprising:
   means for generating a set point signal indicative of a desired length of sheet to be cut from a moving web;
   digital means for computing and temporarily storing sheet length error in response to the speed of the web, the speed of a cutting knife and the set point signal;
   digital means for computing the actual length of sheet cut from the moving web and for generating a signal indicative thereof in response to the speeds of the web and the cutting knife;
   digital means for temporarily storing said signal indicative of said actual sheet length;
   digital means for cyclically incrementing and decrementing said temporary digital storing means;
   digital means for determining whether said sheet length error is within prescribed coarse limits of said desired sheet length in response to said cyclically incremented and decremented temporary digital storing means;
   means for determining whether said stored sheet length error is within a predetermined fine tolerance band of said desired sheet length;
   digital means for actuating a positioning motor at a first speed to correct said sheet length error if said sheet length error is determined to be outside said prescribed coarse limits and at a second speed if said sheet length error is determined to be within said prescribed coarse limits but outside said predetermined fine tolerance band;
   digital means for simulating the correction of said sheet length error effected by the positioning motor at said first and second speeds and for reducing said stored sheet length error and correcting said stored signal indicative of said actual sheet length as functions thereof; and
   means for terminating actuation of the positioning motor if said stored sheet length error is either reduced to zero or determined to be within said predetermined fine tolerance band.

2. Apparatus according to claim 1 wherein said simulating means includes means for selectively generating pulses at a first repetition frequency if said sheet length error is determined to be outside said prescribed coarse limits and at a second pulse repetition frequency if said sheet length error is determined to be within said prescribed coarse limits but outside said predetermined fine tolerance band, digital means for storing information describing the relationship between sheet length correction and rotative displacement of the positioning motor shaft, and means for generating a series of pulses which simulate the sheet length correction effected by said positioning motor in response to said stored information and said selective pulse generating means and for reducing said stored sheet length error and correcting said stored signal indicative of said actual sheet length as functions thereof.

3. Apparatus according to claim 1 wherein said means for determining whether said stored sheet length error is within a predetermined fine tolerance band includes digital means for determining whether said actual sheet length is less than a preselected length, means for selectively generating a first digital signal indicative of a first fine tolerance band if said actual sheet length is determined to be less than said preselected length and a second digital signal indicative of a second fine tolerance band otherwise, and comparator means for comparing said stored sheet length error to said first or second fine tolerance band signals to determine whether said sheet length error is within said first or second fine tolerance bands.

4. Apparatus according to claim 1 including digital means for determining whether the sheet length errors of two or more successive sheets cut from the moving web are outside said fine tolerance band and for generating a digital detecting signal indicative thereof, and means for actuating said positioning motor at said second speed in response to said digital detection signal and preventing actuation of said positioning motor otherwise.

5. An improved cut-off control for operating a cut-off mechanism including a positioning motor having a shaft operatively associated with a variable speed transmission which drives one or more cutting knives to cut sheets of uniform length from a moving web, said cut-off control including means for computing actual sheet length and sheet length error and for generating separate signals indicative thereof, comprising:
  digital means for temporarily storing said signal indicative of said actual sheet length;
  digital means for cyclically incrementing and decrementing said temporary storing means;
  digital means for determining whether said sheet length error is within prescribed limits of said uniform sheet length in response to said cyclically incremented and decremented temporary digital storing means; and
  digital means for actuating a positioning motor to correct said sheet length error if said sheet length error is determined to be outside said prescribed limits.

6. An improved cut-off control for operating a cut-off mechanism including a positioning motor having a shaft operatively associated with a variable speed transmission which drives one or more cutting knives to cut sheets of uniform length from a moving web, said cut-off control including means for computing actual sheet length and sheet length error and for generating separate signals indicative thereof, comprising:
  digital means for temporarily storing said computed sheet length error signal;
  digital means for temporarily storing said computed actual sheet length signal;
  digital means for actuating a positioning motor to correct the sheet length error in response to said stored sheet length error signal;
  digital means for simulating the correction of said sheet length error effected by the positioning motor and for reducing said stored sheet length error and correcting said stored actual sheet length as functions thereof including a pulse generator for generating a series of pulses at a fixed pulse repetition frequency, a read-only memory programmed with information which described the relationship between sheet length correction and rotative displacement of the positioning motor shaft, means for addressing said read-only memory in response to said digital means for temporarily storing said computed actual sheet length, and means for reducing said stored sheet length error signal and correcting said stored actual sheet length signal in response to said read-only memory information and said pulse generator; and
  means for terminating actuation of the positioning motor if said stored sheet length error signal is reduced to a predetermined level.

7. The improved cut-off control according to claim 6 including digital means for determining whether the sheet length errors of two or more successive sheets cut from the moving web are outside a tolerance band and for generating a digital detection signal indicative thereof, and means for actuating said positioning motor in response to said digital detection signal and preventing actuation of said positioning motor otherwise.

8. A method of controlling the length of sheets cut by one or more cutting knives from a moving web, comprising:
  generating a set point signal indicative of a desired length of sheet to be cut from a moving web;
  digitally computing and temporarily storing sheet length error in response to the speed of the web, the speed of the cutting knife and the set point signal;
  digitally computing the actual length of sheet cut from the moving web in response to the speeds of the web and the cutting knife and generating a signal indicative thereof;
  temporarily storing said signal indicative of said actual sheet length;
  cylically incrementing and decrementing said signal indicative of said actual sheet length;
  digitally determining whether said sheet length error is within prescribed coarse limits of desired sheet length as a function of said cyclically incrementing and decrementing step;
  digitally determining whether said stored sheet length error is within a predetermined fine tolerance band of said desired sheet length;
  adjusting the speed of said one or more cutting knives at a first rate to correct said sheet length error if said sheet length error is determined to be outside said prescribed coarse limits and a second rate if said sheet length error is determined to be within said prescribed coarse limits but outside said predetermined fine tolerance band;
  simulating the correction of sheet length error effected by said adjusting step at said first and second speeds and reducing said stored sheet length error and correcting said stored signal indicative of said actual sheet length as functions thereof; and
  terminating said adjusting step if said stored sheet length error is either reduced to zero or determined to be within said predetermined fine tolerance band.

9. An improved method of operating a cut-off mechanism having one or more cutting knives for cutting sheets of uniform length from a moving web including computing actual sheet length and sheet length error and generating separate signals indicative thereof, comprising:

temporarily storing signals indicative of actual sheet length and sheet length error;

cyclically incrementing and decrementing said temporarily stored signal indicative of actual sheet length;

digitally determining whether said sheet length error is within prescribed limits of said uniform sheet length as a function of said cyclically incrementing and decrementing step; and adjusting the speed of one or more cutting knives to correct said sheet length error if said sheet length error is determined to be outside said prescribed limits.

10. An improved method of operating a cut-off mechanism having one or more cutting knives for cutting sheets of uniform length from a moving web including computing actual sheet length and sheet length error and generating separate signals indicative thereof, comprising:

temporarily storing signals indicative of actual sheets length and sheet length error;

adjusting the speed of one or more cutting knives to correct said sheet length error;

digitally simulating the correction of said sheet length error effected by said adjusting step and reducing said stored sheet length error signal and correcting said stored actual sheet length signal as functions thereof including generating a series of pulses at a fixed pulse repetition frequency, programming a read-only memory with information describing the relationship between sheet length correction and adjustment of the speed of said one or more cutting knives, addressing said read-only memory as a function of said stored actual sheet length signal, and reducing the stored sheet length error signal and correcting the stored acutal sheet length signal as a functions of said addressing and generating steps; and terminating adjustment of the speed of said one or more cutting knives if said stored sheet length error signal is reduced to a predetermined level.

* * * * *